United States Patent
Ahn et al.

(10) Patent No.: US 11,000,829 B2
(45) Date of Patent: May 11, 2021

(54) SUPER ABSORBENT POLYMER AND METHOD FOR PRODUCING SAME

(71) Applicant: LG Chem, Ltd., Seoul (KR)

(72) Inventors: Tae Bin Ahn, Daejeon (KR); Dong Hyun Kim, Daejeon (KR); Yeon Soo Kim, Daejeon (KR); Hyun Sup Lee, Daejeon (KR); Chang Sun Han, Daejeon (KR); Myung Han Lee, Daejeon (KR)

(73) Assignee: LG Chem, Ltd.

( * ) Notice: Subject to any disclaimer, the term of this patent is extended or adjusted under 35 U.S.C. 154(b) by 169 days.

(21) Appl. No.: 16/305,698

(22) PCT Filed: Oct. 25, 2017

(86) PCT No.: PCT/KR2017/011855
§ 371 (c)(1),
(2) Date: Nov. 29, 2018

(87) PCT Pub. No.: WO2018/117391
PCT Pub. Date: Jun. 28, 2018

(65) Prior Publication Data
US 2020/0009530 A1 Jan. 9, 2020

(30) Foreign Application Priority Data
Dec. 23, 2016 (KR) .................... 10-2016-0178407

(51) Int. Cl.
*B01J 20/00* (2006.01)
*B01J 20/26* (2006.01)
*B01J 20/30* (2006.01)
*C08F 220/40* (2006.01)
*C08J 3/24* (2006.01)

(52) U.S. Cl.
CPC ......... *B01J 20/267* (2013.01); *B01J 20/3021* (2013.01); *B01J 20/3085* (2013.01); *C08F 220/40* (2013.01); *C08J 3/245* (2013.01); *C08J 2333/10* (2013.01)

(58) Field of Classification Search
CPC .. B01J 20/267; B01J 20/3021; B01J 20/3085; B01J 2220/68; C08F 220/40; C08F 6/008; C08F 2/50; C08F 4/34; C08F 4/40; C08F 220/06; C08F 2/44; C08J 3/245; C08J 2333/10; C08J 2333/02; C08J 3/12; C08J 3/075; C08K 5/11; C08L 33/06
See application file for complete search history.

(56) References Cited

U.S. PATENT DOCUMENTS

| | | |
|---|---|---|
| 5,149,335 A | 9/1992 | Kellenberger et al. |
| 5,562,646 A | 10/1996 | Goldman et al. |
| 5,801,116 A * | 9/1998 | Cottrell ............... A61L 15/28 502/401 |
| 6,143,821 A | 11/2000 | Houben |
| 7,108,916 B2 | 9/2006 | Ehmsperger et al. |
| 2005/0003191 A1 | 1/2005 | Ehrnsperger et al. |
| 2007/0207924 A1 | 9/2007 | Ikeuchi et al. |
| 2009/0131255 A1 | 5/2009 | Ikeuchi et al. |
| 2010/0184594 A1 | 7/2010 | Riegel et al. |
| 2010/0270501 A1 | 10/2010 | Torii et al. |
| 2013/0026412 A1 | 1/2013 | Machida et al. |
| 2013/0172180 A1 | 7/2013 | Naumann et al. |
| 2014/0312273 A1 | 10/2014 | Wattebled et al. |
| 2015/0315321 A1 * | 11/2015 | Won .................... C08J 3/245 525/328.8 |
| 2015/0376318 A1 | 12/2015 | Haag et al. |
| 2016/0096944 A1 | 4/2016 | Wattebled et al. |
| 2016/0311985 A1 * | 10/2016 | Jung ..................... A61L 15/24 |
| 2017/0009026 A1 | 1/2017 | Nam et al. |
| 2017/0065739 A1 | 3/2017 | Braun et al. |
| 2017/0073478 A1 | 3/2017 | Joo et al. |
| 2017/0226248 A1 | 8/2017 | Kim et al. |
| 2018/0001300 A1 | 1/2018 | Nakatsuru et al. |
| 2018/0185820 A1 | 7/2018 | Tada et al. |
| 2018/0243464 A1 | 8/2018 | Hwang et al. |

FOREIGN PATENT DOCUMENTS

| | | |
|---|---|---|
| CN | 103857714 A | 6/2014 |
| CN | 105814088 A | 7/2016 |
| EP | 0443627 A2 | 8/1991 |
| EP | 1493453 A1 | 1/2005 |

(Continued)

OTHER PUBLICATIONS

Search report from International Application No. PCT/KR2017/011855, dated Feb. 8, 2018.
Odian, George, Principles of Polymerization, Second Edition, a Wiley-Interscience Publication, 1981, p. 203.
Schwalm, Reinhold, "UV Coatings: Basics, Recent Devlopments and New Applications." Elsevier Science, Dec. 21, 2006, p. 115.
Buchholz et al, Modern Superabsorbent Polymer Technology, book, 1998, pp. 69-103, Wiley-VCH, United States.
Extended European Search Report including Written Opinion for EP17883446.1, dated Jun. 14, 2019, pp. 1-12.

(Continued)

*Primary Examiner* — Robert C Boyle

(74) *Attorney, Agent, or Firm* — Lerner, David, Littenberg, Krumholz & Mentlik, LLP

(57) ABSTRACT

The super absorbent polymer comprises: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer has: a fixed height absorption (FHA) of 22.5 g/g to 29 g/g, a saline flow conductivity (SFC) of 35 ($\cdot 10^{-7}$ cm$^3 \cdot$s/g) or more, and T-20 of 180 seconds or less.

6 Claims, No Drawings

(56) References Cited

FOREIGN PATENT DOCUMENTS

| | | |
|---|---|---|
| EP | 1690887 A1 | 8/2006 |
| EP | 2535027 A1 | 12/2012 |
| EP | 2952537 A1 | 12/2015 |
| EP | 3067370 A1 | 9/2016 |
| EP | 3241861 A1 | 11/2017 |
| EP | 3336134 A1 | 6/2018 |
| EP | 3345958 A1 | 7/2018 |
| JP | 3415036 B2 | 6/2003 |
| KR | 20070007162 A | 1/2007 |
| KR | 20140107491 A | 9/2014 |
| KR | 20160016714 A | 2/2016 |
| KR | 20160061743 A | 6/2016 |
| KR | 20160117180 A | 10/2016 |
| KR | 20170111295 A | 10/2017 |
| KR | 20170112856 A | 10/2017 |
| WO | 9526209 A1 | 10/1995 |
| WO | 2009016055 A2 | 2/2009 |
| WO | 2009110645 A1 | 9/2009 |
| WO | 2015041784 A1 | 3/2015 |
| WO | 2015169912 A1 | 11/2015 |
| WO | 2015175620 A1 | 11/2015 |
| WO | 2016056866 A1 | 4/2016 |
| WO | 2016111223 A1 | 7/2016 |
| WO | 2016134906 A1 | 9/2016 |
| WO | 2016158975 A1 | 10/2016 |

OTHER PUBLICATIONS

Third Party Observation for PCT/KR2017/011855 submitted Apr. 19, 2019, pp. 1-15.
Third Party Observation for PCT/KR2017/011855 submitted Apr. 23, 2019, pp. 1-18.

* cited by examiner

SUPER ABSORBENT POLYMER AND METHOD FOR PRODUCING SAME

CROSS-REFERENCE TO RELATED APPLICATION(S)

The present application is a national phase entry under 35 U.S.C. § 371 of International Application No. PCT/KR2017/011855 filed Oct. 25, 2017, which claims priority from Korean Patent Application No. 10-2016-0178407 filed on Dec. 23, 2016, the disclosures of which are incorporated herein by reference.

TECHNICAL FIELD

The present invention relates to a super absorbent polymer exhibiting more improved absorption rate and liquid permeability, as well as having excellent basic absorption performance, and a method for producing the same.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins. For these applications, the super absorbent polymers should exhibit a high absorption performance with respect to moisture, etc., it should not release the absorbed water even in the external pressure, and additionally it should well retain the shape even in a state where the volume is expanded (swelled) by absorbing water, and thereby exhibit excellent liquid permeability.

In recent years, as the demand for a thin diaper increases, the proportion of the absorbent polymer in the diaper tends to increase. Therefore, the water absorbent polymer needs to have the performance of the fiber material of the diaper. For this, the water absorbent polymer should have a high water absorption performance as well as a high absorption rate and a liquid permeability.

In the process of producing the water absorbent polymer, it is generally necessary to pulverize the hydrogel prepared by polymerizing the monomer of the water absorbent polymer. The pulverization of the hydrogel is a process required for producing a super absorbent polymer in the form of a powder or a particle, and this process greatly affects the physical properties of the super absorbent polymer.

In this regard, various studies have been undertaken. As an example, Japanese Patent No. 3415036 discloses a preparation method that minimizes damage to hydrogel during pulverization of the hydrogel, in order to reduce extractable contents that can induce a reduction in water absorption capacity. However, the above method can achieve a high absorption performance, but it is insufficient to obtain the absorption rate at the level recently required for diapers.

As another example, International Application PCT-JP2011-058829 has attempted to achieve a high absorption rate by adjusting the gel grinding energy, but in this case, there is a disadvantage that, for example, absorption under pressure or without pressure is lowered.

For these reasons, there is a continuing need to develop a technique capable of providing a super absorbent polymer having more improved water absorption capacity, absorption rate and liquid permeability while maintaining excellent basic absorption performance.

Technical Problem

It is one object of the present invention to provide a super absorbent polymer exhibiting more improved absorption rate and liquid permeability, as well as having excellent basic absorption performance, and a method for producing the same.

Technical Solution

The present invention provides a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer has the following features: a fixed height absorption (FHA) (20 cm) for a physiological saline solution (0.9 wt % aqueous sodium chloride solution) of 22.5 g/g to 29 g/g, a saline flow conductivity (SFC) for a physiological saline solution (0.685 wt % aqueous sodium chloride solution) of 35 ($\cdot 10^{-7}$ cm$^3$·s/g) or more, and T-20 of 180 seconds or less which indicates the time required for absorbing 1 g of the super absorbent polymer to 20 g of aqueous solution of 0.9 wt % sodium chloride and 0.01 wt % alcohol ethoxylate having 12 to 14 carbon atoms under pressure of 0.3 psi.

As another example of the super absorbent polymer, the present invention provides a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer has the following features: a fixed height absorption (FHA) (20 cm) for a physiological saline solution (0.9 wt % aqueous sodium chloride solution) of 22.5 g/g to 29 g/g, a centrifuge retention capacity (CRC) for a physiological saline solution (0.9 wt % aqueous sodium chloride solution) for 30 minutes of 26 g/g to 34 g/g, a saline flow conductivity (SFC) for a physiological saline solution (0.685 wt % aqueous sodium chloride solution) of 35 ($\cdot 10^{-7}$ cm$^3$·s/g) or more, and a free swell rate (FSR) of 0.25 g/g/s to 0.40 g/g/s when 1 g of the super absorbent polymer absorbs 20 g of a 0.9 wt % aqueous sodium chloride solution.

In addition, the present invention provides a method for producing a super absorbent polymer comprising the steps of: performing crosslinking polymerization of a water-soluble ethylenically unsaturated monomer having at least partially neutralized acidic groups in the presence of an internal crosslinking agent to form a hydrogel polymer containing a first crosslinked polymer and having a gel strength of 1.0000 Pa or more; performing gel pulverization of the hydrogel polymer so that the gel strength after pulverization becomes 35% to 95% of the gel strength before pulverization; drying, pulverizing and classifying the gel pulverized hydrogel polymer to form a base polymer power; and heat-treating and surface-crosslinking the base polymer powder in the presence of a surface crosslinking agent to form a super absorbent polymer particle.

Hereinafter, a super absorbent polymer according to a specific embodiment of the present invention and a production method thereof will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprises" or "contains" refers to including any constituent element (or constituent component) without particular limitation, and it cannot be interpreted as a meaning of excluding an addition of other constituent element (or constituent component).

According to one embodiment of the invention, there is provided a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the super absorbent polymer has the following features: a fixed height absorption (FHA) (20 cm) for a physiological saline solution (0.9 wt % aqueous sodium chloride solution) of 22.5 g/g to 29 g/g, a saline flow conductivity (SFC) for a physiological saline solution (0.685 wt % aqueous sodium chloride solution) of 35 ($\cdot 10^{-7}$ cm$^3 \cdot$s/g) or more, and T-20 of 180 seconds or less which indicates the time required for absorbing 1 g of the super absorbent polymer to 20 g of aqueous solution of 0.9 wt % sodium chloride and 0.01 wt % alcohol ethoxylate having 12 to 14 carbon atoms under pressure of 0.3 psi.

As a result of continuous studies and experiments, the present inventors have found that according to a production method described later, when controlling the polymerization conditions to obtain a hydrogel polymer having a high gel strength, controlling the gel-pulverizing condition thereof so that the gel strength after gel-pulverization is maintained in an appropriate range and then producing a super absorbent polymer through a subsequent process, it is possible to produce and provide a super absorbent polymer having not only excellent basic absorption performance but also greatly improved liquid permeability and absorption rate, thereby completing the present invention.

That is, by basically obtaining a hydrogel polymer having a high gel strength and adjusting the gel pulverizing condition so that the gel strength of the hydrogel polymer can be maintained at a certain level or more even after the gel pulverization, it is possible to provide a base polymer powder and a super absorbent polymer exhibiting a relatively high gel strength. Accordingly, the super absorbent polymer of one embodiment can exhibit excellent liquid permeability defined by a relatively high SFC and excellent suction force under pressure such as absorption under pressure defined by high FHA and the like.

Moreover, it has been found that since the base polymer powder and the super absorbent polymer containing a large number of pores and having a large surface area can be obtained by the progress of the gel pulverization, the super absorbent polymer of one embodiment can exhibit an improved absorption rate as defined, for example, by the physical properties such as T-20.

In addition, after basically obtaining a hydrogel polymer having a high gel strength, as the gel pulverization condition is controlled so that the gel strength after pulverization is maintained at a certain level or more, the super absorbent polymer of one embodiment obtained through such a method can reduce the generation of extractable contents and the deterioration of absorption performance in the course of its production. Therefore, the super absorbent polymer of one embodiment can exhibit more improved absorption rate and liquid permeability, while maintaining excellent basic absorption performance, and can be preferably used for hygienic materials such as diapers having a thinner thickness.

Hereinafter, the super absorbent polymer of one embodiment will be described in more detail.

Further, the term "super absorbent polymer" as used herein refers to a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent.

The water-soluble ethylenically unsaturated monomer may be any monomer commonly used in the production of a super absorbent polymer. As a non-limiting example, the water-soluble ethylenically unsaturated monomer may be a compound represented by the following Chemical Formula 1:

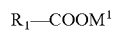   [Chemical Formula 1]

in Chemical Formula 1, $R_1$ is an alkyl group having 2 to 5 carbon atoms containing an unsaturated bond, and $M^1$ is a hydrogen atom, a monovalent or divalent metal, an ammonium group or an organic amine salt.

Preferably, the above-described monomer may be at least one selected from the group consisting of acrylic acid, methacrylic acid, and a monovalent metal salt, a divalent metal salt, an ammonium salt, and an organic amine salt thereof. When acrylic acid or a salt thereof is used as the water-soluble ethylenically unsaturated monomer, it is advantageous in that a super absorbent polymer having improved absorption property can be obtained. In addition, the above-mentioned monomer used herein may include at least one selected from the group consisting of an anionic monomer such as maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; a nonionic hydrophilic monomer such as (meth)acrylamide, N-substituted (meth)acrylate, 2-hydroxyethyl(meth)acrylate, 2-hydroxypropyl (meth)acrylate, methoxypolyethyleneglycol(meth)acrylate, or polyethyleneglycol(meth)acrylate; and an unsaturated monomer containing amino group such as (N,N)-dimethylaminoethyl(meth)acrylate or (N,N)-dimethylaminopropyl (meth)acrylamide, and a quaternary compound thereof.

Here, the water soluble ethylenically unsaturated monomer may have an acidic group, wherein at least a part of the acidic group is neutralized. Preferably, those in which the monomer is partially neutralized with an alkaline substance such as sodium hydroxide, potassium hydroxide, ammonium hydroxide or the like can be used.

In this case, the degree of neutralization of the monomer may be 40 to 95 mol %, or 40 to 80 mol %, or 45 to 75 mol %. The range of the degree of neutralization may vary depending on the final physical properties. However, an excessively high degree of neutralization causes the neutralized monomers to be precipitated, and thus polymerization may not readily occur, whereas an excessively low degree of neutralization not only greatly deteriorates the absorption performance of the polymer, but also endows the polymer with hard-to-handle properties, like elastic rubber.

The "first crosslinked polymer" means that the above-mentioned water-soluble ethylenically unsaturated monomer is subjected to a crosslinking polymerization in the presence of an internal crosslinking agent, and the "base polymer powder" means a substance containing such a first crosslinked polymer. In addition, the "second crosslinked polymer" means a substance in which the first crosslinked polymer is additionally crosslinked via a surface crosslinking agent, whereby the second crosslinked polymer is formed on the base polymer powder. The surface crosslinking agent will be described later.

The super absorbent polymer of one embodiment is excellent in water absorption capacity, absorption rate and liquid permeability, which can be expressed by physical properties such as CRC, FHA, SFC, T-20 or FSR.

Specifically, the super absorbent polymer of one embodiment has a centrifuge retention capacity (CRC) for a physiological saline solution (0.9 wt % aqueous sodium chloride solution) for 30 minutes of 26 g/g or more, preferably 26.5 g/g or more, or 27.0 g/g or more. Higher the value of CRC, the more excellent it is. Thus, the upper limit thereof is not restricted, but as an example, it is 34 g/g or less, 32 g/g or less, 30 g/g or less, or 29.5 g/g or less. The centrifuge retention capacity (CRC) for a physiological saline can be calculated by the following Equation 1 after absorbing the super absorbent polymer to a physiological saline solution over 30 minutes:

$$CRC(g/g)=\{[W_2(g)-W_1(g)-W_0(g)]/W_0(g)\}$$ [Equation 1]

in Equation 1, $W_0(g)$ is an initial weight(g) of the super absorbent polymer, $W_1(g)$ is a weight of bag measured after impregnating a nonwoven fabric bag not containing a super absorbent polymer in a physiological saline solution at room temperature for 30 minutes and then dehydrating the same by using a centrifuge at 250 G for 3 minutes, and $W_2(g)$ is a weight of bag measured after impregnating a nonwoven fabric bag containing a super absorbent polymer in physiological saline at room temperature for 30 minutes and then dehydrating the same by using a centrifuge at 250 G for 3 minutes.

Moreover, the super absorbent polymer of one embodiment may have a fixed height absorption (FHA) (20 cm) of 22.5 g/g or more, preferably 23 g/g or more, 23.5 g/g or more, or 23.7 g/g or more as measured after absorbing the same in a physiological saline solution (0.9 wt % aqueous sodium chloride solution) for 1 hour under pressure of 0.3 psi. The upper limit thereof is not restricted, but as an example, it may be 29 g/g or less, 27 g/g or less, or 26 g/g or less. The FHA may be measured and calculated by the method described in Examples of U.S. Pat. No. 7,108,916.

Such an FHA can define an excellent suction force under pressure exhibited by the super absorbent polymer of one embodiment. As the super absorbent polymer of one embodiment includes a base polymer powder that maintains a relatively high gel strength, excellent FHA and superior absorption under pressure as defined thereby.

In addition, the super absorbent polymer of one embodiment has a saline flow conductivity (SFC, $10^{-7}$ cm$^3$·s/g) for a physiological saline solution (0.685 wt % aqueous sodium chloride solution) of 35 or more, preferably 40 or more, 45 or more, or 47 or more. The upper limit of SFC is not restricted, but as an example, it is 150 or less, 140 or less, 130 or less, 100 or less, or 80 or less. The saline flow conductivity (SFC) may be measured and calculated according to methods well known to those skilled in the art, for example, the methods disclosed in columns 54 to 59 of U.S. Pat. No. 5,562,646.

The super absorbent polymer includes a base polymer powder which maintains a high gel strength, and includes a surface crosslinked layer through a surface crosslinking, and thus can exhibit a more improved SFC and excellent liquid permeability defined thereby.

Further, the super absorbent polymer of one embodiment has T-20 of 180 seconds or less, 170 seconds or less, or 160 seconds or less which indicates the time required for absorbing 1 g of the super absorbent polymer to 20 g of aqueous solution of sodium chloride and alcohol ethoxylate having 12 to 14 carbon atoms under pressure of 0.3 psi. The lower limit of T-20 is not restricted, but as an example, it is 80 seconds or more, 90 seconds or more, 100 seconds or more, or 120 seconds or more. 9 g of sodium chloride (0.9 wt %) and 0.1 g of Lorodac (main component: linear alcohol ethoxylate having 12 to 14 carbon atoms, CAS #68439-50-9) (0.01 wt %) are dissolved in 1 L of distilled water to make an aqueous solution, and the T-20 can be calculated and measured with the time required for absorbing 1 g of the super absorbent polymer to 20 g of this aqueous solution under pressure of 0.3 psi. Specific measurement methods of T-20 are described in detail on pages 13 to 18 of European Patent Publication No. 2,535,027.

The super absorbent polymer of one embodiment can include a base polymer powder having a large surface area by optimizing the gel pulverizing conditions of the hydrogel polymer in its production process. Thereby, the super absorbent polymer can exhibit an improved absorption rate than previously known.

Further, the super absorbent polymer of one embodiment has the free swell rate (FSR) of 0.25 g/g/s or more, preferably 0.27 g/g/s or more, 0.28 g/g/s or more, or 0.29 g/g/s or more, when 1 g of the super absorbent polymer absorbs 20 g of a 0.9 wt % aqueous sodium chloride solution. The upper limit of the FSR is not restricted, but as an example, it is 0.40 g/g/s or less, 0.39 g/g/s or less, 0.38 g/g/s or less, 0.37 g/g/s or less, or 0.36 g/g/s or less.

This FSR range can also define the high absorption rate exhibited by the super absorbent polymer of one embodiment.

Meanwhile, in the super absorbent polymer of the one embodiment described above, the first crosslinked polymer included in the base polymer powder may be a polymer in which the monomer-crosslinked in the presence of a polyolpoly(meth)acrylate-based first internal crosslinking agent selected from the group consisting of trimethylolpropane meth)acrylate, ethylene glycol di(meth)acrylate, polyethylene glycol(meth)acrylate, propylene glycol di(meth)acrylate, polypropylene glycoldi(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate; and an allyl(meth)acrylate-based second crosslinking agent. By applying these two or more specific internal crosslinking agents, the super absorbent polymer of one embodiment includes a base polymer powder that maintains a high gel strength even after carrying out gel-pulverization, pulverization or the like, and thereby superior liquid permeability and absorption under pressure can be exhibited.

The super absorbent polymer of one embodiment described above may have a particle diameter of 150 to 850 µm. More specifically, at least 95% by weight of the base polymer powder and the super absorbent polymer containing the same may have a particle diameter of 150 to 850 µm and a fine powder having a particle diameter of less than 150 µm may be less than 3% by weight.

Meanwhile, the super absorbent polymer satisfying the above-mentioned various properties of the embodiment can be produced by a specific production method in which the hydrogel polymerization conditions are controlled to obtain a hydrogel polymer exhibiting higher gel strength, and then the gel pulverization conditions and the like are controlled to maintain the gel strength after pulverization at a constant level.

According to another embodiment of the present invention, there is provided a process for producing the above-mentioned super absorbent polymer. Such production method may include the steps of: performing crosslinking polymerization of a water-soluble ethylenically unsaturated monomer having at least partially neutralized acidic groups in the presence of an internal crosslinking agent to form a hydrogel polymer containing a first crosslinked polymer and having a gel strength pf 10000 Pa or more performing gel pulverization of the hydrogel polymer so that the gel strength after pulverization becomes 35% to 95% of the gel strength before pulverization, drying, pulverizing and classifying the gel pulverized hydrogel polymer to form a base polymer power; and heat-treating and surface-crosslinking the base polymer powder in the presence of a surface crosslinking agent to form a super absorbent polymer particle.

Hereinafter, the above production method will be described in detail for each step.

First, the production method of another embodiment includes a step of forming a hydrogel polymer by crosslinking. Specifically, this is a step of performing thermal polymerization or photo-polymerization of a monomer composition comprising a water-soluble ethylenically unsaturated monomer and a polymerization initiator in the presence of an internal crosslinking agent to form a hydrogel polymer.

The water-soluble ethylenically unsaturated monomer contained in the monomer composition is the same as described above.

In addition, the monomer composition may include a polymerization initiator generally used in the production of a super absorbent polymer. As a non-limiting example, as the polymerization initiator, a thermal polymerization initiator, a photo-polymerization initiator or the like may be used depending on the polymerization method. However, even in the case of the photo-polymerization method, a certain amount of heat is generated by ultraviolet irradiation or the like, and a certain amount of heat is generated in accordance with the progress of the polymerization reaction, which is an exothermic reaction, and thus, a thermal polymerization initiator may further be included.

The photo-polymerization initiator used herein may include, for example, one or more compounds selected from the group consisting of benzoin ether, dialkyl acetophenone, hydroxyl alkyl ketone, phenyl glyoxylate, benzyl dimethyl ketal, acyl phosphine and α-aminoketone. Among them, as a specific example of the acylphosphine, a commonly used lucyrin TPO, that is, 2,4,6-trimethyl-benzoyl-trimethyl phosphine oxide may be used. More various photo-polymerization initiators are well disclosed in "UV Coatings: Basics, Recent Developments and New Application" written by Reinhold Schwalm, (Elsevier, 2007), p 115, the content of which is incorporated herein by reference.

Moreover, as the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like. In addition, examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) or the like. More various thermal polymerization initiators are well disclosed in "Principle of Polymerization" written by Odian, (Wiley, 1981), p 203, the content of which is incorporated herein by reference.

The polymerization initiator may be included in a concentration of about 0.001 to 1% by weight based on the monomer composition. That is, when the concentration of the polymerization initiator is too low, the polymerization rate may become slow and a large amount of residual monomer may be extracted in the final product, which is not preferable. On the other hand, when the concentration of the polymerization initiator is too high, the polymer chains constituting the network become short, and thus the extractable contents are increased and physical properties of the polymer may deteriorate such as a reduction in absorption under pressure.

Meanwhile, the monomer composition may include a crosslinking agent ("internal crosslinking agent") to improve physical properties of the polymer by polymerization of the water-soluble ethylenically unsaturated monomer. The crosslinking agent is used for internal crosslinking of the hydrogel polymer, and is used separately from a surface crosslinking agent described below.

Particularly, in the production method of the another embodiment, the above-mentioned two or more internal crosslinking agents, for example, the polyol poly(meth)acrylate first internal crosslinking agent and the allyl(meth)acrylate-based second internal crosslinking agent can be used together to obtain a hydrogel polymer having a higher gel strength, for example, a gel strength of 10000 Pa or more, or 11000 Pa or more, or 120000 Pa or more, and but not particularly limited thereto, 50000 Pa or less, or 40,000 Pa or less, or 38,000 Pa or less.

More specifically, as the first internal crosslinking agent, at least one selected from the group consisting of trimethylolpropane tri(meth)acrylate, ethylene glycol di(meth)acrylate, polyethylene glycol di(meth)acrylate, propylene glycol di(meth)acrylate, polypropylene di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, and pentaerythritol tetraacrylate may be used, and as the second internal crosslinking agent, allyl(meth)acrylate, allylacrylate, and the like may be used.

Further, the first internal crosslinking agent may be added in an amount of 0.4 to 1 part by weight, or 0.5 to 0.9 parts by weight, or 0.6 to 0.8 parts by weight, based on 1.00 parts by weight of the entire monomer composition including the internal crosslinking agent, the monomer and the like. The second internal crosslinking agent may be added in an amount of 0.008 to 0.5 parts by weight, or 0.01 to 0.1 parts by weight, or 0.01 to 0.05 parts by weight, based on 100 parts by weight of the entire monomer composition. In this way, by controlling the composition such as the type and content range of the internal crosslinking agent and also controlling the water content of the hydrogel polymer to be described later, a hydrogel polymer exhibiting a gel strength of 10,000 Pa or more can be obtained more effectively, and a super absorbent polymer satisfying the physical properties of one embodiment can be obtained more effectively. However, if the content of the internal crosslinking agent is excessively large, the basic absorption performance of the super absorbent polymer may be deteriorated.

In addition, the monomer composition may further include an additive such as a thickener, a plasticizer, a preservation stabilizer, an antioxidant, etc., if necessary.

Further, such monomer composition can be prepared in the form of a solution in which raw materials such as the above-described monomer, polymerization initiator, internal crosslinking agent, etc. are dissolved in a solvent.

In this case, any usable solvent can be used without limitation in the constitution as long as it can dissolve the above-mentioned raw materials. Examples of the solvent may include water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof.

Further, the formation of the hydrogel polymer through polymerization of the monomer composition may be performed by a general polymerization method, and the process is not particularly limited. As a non-limiting example, the polymerization method are largely classified into a thermal polymerization and a photo-polymerization according to the type of the polymerization energy source, and the thermal polymerization may be carried out in a reactor like a kneader equipped with agitating spindles and the photo-polymerization may be carried out in a reactor equipped with a movable conveyor belt.

As an example, the monomer composition is injected into a reactor like a kneader equipped with the agitating spindles, and thermal polymerization is performed by providing hot air thereto or heating the reactor, thereby obtaining the hydrogel polymer. In this case, the hydrogel polymer, which is discharged from the outlet of the reactor according to the type of agitating spindles equipped in the reactor, may be obtained as particles with a size of centimeters or millimeters. Specifically, the hydrogel polymer may be obtained in various forms according to the concentration of the monomer composition injected thereto, the injection speed, or the like, and the hydrogel polymer having a (weight average) particle diameter of 2 to 50 mm may be generally obtained.

As another example, when the photo-polymerization of the monomer composition is performed in a reactor equipped with a movable conveyor belt, a sheet-shaped hydrogel polymer may be obtained. In this case, the thickness of the sheet may vary depending on the concentration of the monomer composition injected thereto and the injection speed, and the polymer sheet is preferably controlled to have typically a thickness of 0.5 to 10 cm in order to secure the production speed or the like while enabling a uniform polymerization of the entire sheet.

In this case, the hydrogel polymer obtained by the above-mentioned method may have a water content of 38 to 60% by weight or 40 to 55% by weight. The "water content" as used herein means a weight occupied by moisture with respect to a total weight of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the drying process by raising the temperature of the polymer through infrared heating. At this time, the drying conditions may be determined as follows: the drying temperature is increased from room temperature to about 180° C. and then the temperature may be maintained at 180° C., and the total drying time may be set to 20 minutes, including 5 minutes for the temperature rising step.

Not only the water content of the hydrogel polymer is adjusted to the above-described ranges and thus the gel strength before pulverization of 10000 Pa described above may be achieved more effectively, but also the subsequent gel pulverization can be carried out more effectively. Specifically, the hydrogel polymer is introduced into a gel pulverizer in the state where the water content has been adjusted. As the gel pulverization conditions described below are adjusted, not only the high gel strength range before gel pulverization can be more easily achieved, the gel strength after gel pulverization can be maintained at 35% to 95%, or 50% to 90%, or 60% to 88% of the gel strength before the pulverization. As a result, the inner surface area of the base polymer powder and the super absorbent polymer containing the same is widened, whereby the super absorbent polymer exhibits excellent absorption rate, and also the base polymer powder and the super absorbent polymer can maintain high strength and so exhibit excellent liquid permeability and the like.

Meanwhile, after the hydrogel polymer is formed by the above-mentioned crosslinking polymerization, the hydrogel polymer with controlled water content is gel-pulverized. Such gel pulverization can be carried out so that the gel strength after pulverization becomes 35% to 95% of the gel strength before pulverization. In a specific example, the gel strength after gel pulverization may be from 5000 Pa to 30000 Pa, or from 10000 Pa to 28000 Pa. Thereby, a super absorbent polymer that satisfies the physical properties of the one embodiment can be more effectively obtained.

The pulverizing device used in the pulverization step is not limited in its constitution, but specific examples thereof may include any one selected from the group consisting of a vertical pulverizer, a turbo cutter, a turbo grinder, a rotary cutter mill, a cutter mill, a disc mill, a shred crusher, a crusher, a chopper and a disc cutter. However, it is not limited to the above-described example.

On the other hand, during the gel pulverization of the hydrogel polymer, a shear force and a compressive force is applied to the hydrogel polymer. In the production method of another embodiment, the gel strength range after the gel pulverization described above can be achieved by controlling the gel pulverization conditions.

More specifically, the gel pulverization can be carried out inside a pulverizer including an extruder equipped with a perforated plate such as a screw extruder. At this time, a plurality of holes formed in the perforated plate may have a diameter of 9 to 18 mm, or 10 to 15 mm, whereby the gel pulverization can be carried out by pushing the hydrogel polymer through such a perforated plate and an extruder. Thereby, the hydrogel polymer can maintain an adequate level of gel strength even after gel pulverization, and the gel pulverization is effectively carried out so that the polymer after pulverization can have a large surface area.

That is, when the above-mentioned gel pulverization is carried out, the surface area of the pulverized hydrogel polymer is remarkably increased. Specifically, in the pulverized hydrogel polymer, the percentage of the number of sheared particles is 0.40 or more and 0.95 or less. The "sheared particle" means a particle having three or more concave portions or holes with a depth of 10 μm or more observed on the pulverized hydrogel polymer particle, and the "number ratio of the sheared particles" means the number of the sheared particles relative to the total number of the hydrogel polymer particles. As described above, the sheared particles are produced and the surface area is widened, so that the physical properties of the super absorbent polymer can be more improved and the super absorbent polymer satisfying the various physical properties of one embodiment can be produced more effectively.

On the other hand, the pulverization of the hydrogel polymer may be performed such that the hydrogel polymer has a particle diameter of 0.1 mm to 10 mm. That is, in order to increase the drying efficiency, the hydrogel polymer is preferably pulverized into particles with a size of 10 mm or less. However, since a phenomenon of agglomeration between particles may occur during excessive pulverization, the hydrogel polymer is preferably pulverized into particles with a size of 0.1 mm or more.

In addition, since gel pulverization of the hydrogel polymer is performed out in a state of relatively low water content, a phenomenon in which the hydrogel polymer adheres to the surface of the pulverizing device can occur. In order to minimize such a phenomenon, steam, water, surfactant, agglomeration preventing agent (for example, clay, silica, etc.); persulfate-based initiators, azo-based initiators, hydrogen peroxide, thermal polymerization initiator, epoxy-based crosslinking agent, a diol crosslinking agent, a crosslinking agent containing difunctional, trifunctional or higher polyfunctional acrylate, crosslinking agent with mono-functionality containing a hydroxyl group or the like can be added to the hydrogel polymer as needed.

After the gel pulverization described above, the hydrogel polymer can be dried. The drying can be carried out at a temperature of 120 to 250° C., preferably 140 to 200° C., more preferably 150 to 190° C. In this case, the drying temperature can be defined as the temperature of the heating medium provided thereto for drying, or the internal temperature of the drying reactor including the heating medium and the polymer during the drying process. If the drying temperature is low, and therefore the drying time becomes long, the efficiency of the process may be deteriorated. In order to prevent this problem, the drying temperature is preferably 120° C. or higher. In addition, when the drying temperature is higher than necessary, the surface of the hydrogel polymer is excessively dried, and the occurrence of fine powders may be increased during the subsequent pulverization process and the physical properties of the polymer finally formed may be deteriorated. In order to prevent this problem, therefore, the drying temperature is preferably 250° C. or lower.

In this case, the drying time in the drying step is not particularly limited, but it may be controlled to 20 to 90 minutes at the above drying temperature, in consideration of the process efficiency and the physical properties of the polymer.

The drying can be carried out using a conventional medium, and for example, the drying may be carried out by the methods of subjecting the pulverized hydrogel polymer to hot air supply, infrared irradiation, microwave irradiation, ultraviolet irradiation or the like.

The drying is preferably carried out so that the dried polymer has a water content of about 0.1% to 10% by weight. That is, if the water content of the dried polymer is less than 0.1% by weight, production costs may be increased due to excessive drying and degradation of the crosslinked polymer may occur, which is not desirable. In addition, if the water content of the polymer is more than 10% by weight, defects may occur in a subsequent process, which is not desirable.

After the drying, the dried polymer can be pulverized. Thereby, the particle diameter and surface area of the pulverized polymer can be controlled within an appropriate range. The pulverization can be carried out such that the pulverized polymer has a particle diameter of 150 to 850 μm.

Examples of the pulverizing device that can be used herein include a pin mill, a hammer mill, a screw mill, a roll mill, a disc mill, a jog mill or the like.

Further, in order to control the physical properties of the super absorbent polymer finally produced, the step of selectively classifying particles having a particle diameter of 150 to 850 μm in the polymer particles obtained through the above-mentioned pulverization step may be further performed.

On the other hand, through the classification, polymer particles (fine powder) having a particle diameter of less than 150 μm can be granulated with a solvent (for example, aqueous solvent such as water) usable in the crosslinking polymerization step to prepare a fine powder re-granulated body. The fine powder re-granulated body may be added and mixed to the super absorbent polymer before the drying, for example, to the super absorbent polymer just before or just after the gel pulverization step, and between the drying step.

The fine powder re-granulated body may be mixed in an amount of 10 to 30 parts by weight, or 15 to 28 parts by weight based on 100 parts by weight of the hydrogel polymer before drying. Due to the addition of such fine powder re-granulated body, the internal surface area of the base polymer powder and the super absorbent polymer can be more widened and the super absorbent polymer can exhibit a more enhanced absorption rate. In addition, the strength of the base polymer powder and the super absorbent polymer is controlled to an appropriate range by introducing the fine powder re-granulated body within the above-mentioned content range, and thus various physical properties of one embodiment can be achieved more effectively.

On the other hand, after the base polymer powder is produced through the classification step described above, the base polymer powder can be subjected to heat treatment and surface crosslinking in the presence of a surface crosslinking agent to form super absorbent polymer particles.

The surface crosslinking induces a crosslinking reaction on the surface of the base polymer powder in the presence of a second crosslinking agent (surface crosslinking agent). Through such surface crosslinking, a surface modified layer (surface crosslinked layer) is formed on the surface of the pulverized polymer particles.

The surface crosslinking may be performed by a method of mixing a solution containing a second crosslinking agent (surface crosslinking agent) with the base polymer powder followed by a crosslinking reaction.

Herein, the surface crosslinking agent is a compound capable of reacting with a functional group of the polymer, and may be an alkylene carbonate-based compound or a polyhydric alcohol-based compound. An alkylene carbonate having 2 to 5 carbon atoms is preferable. More preferably, ethylene carbonate can be used as the surface crosslinking agent. In addition to the surface crosslinking agent, silica, clay or the like can be further used. Further, in order to control the penetration rate and depth of the surface crosslinking agent, an acidic compound, a polymer, or the like can be further added, if necessary.

At this time, the content of the surface crosslinking agent may be appropriately controlled according to the kind of crosslinking agent, reaction conditions, etc., and may be preferably adjusted to 0.001 to 5 parts by weight based on 100 parts by weight of the base polymer powder. If the content of the surface crosslinking agent is excessively low, the surface modification may not be properly performed, and the physical properties of the final polymer may be deteriorated. Conversely, if an excess amount of the surface crosslinking agent is used, the basic absorption capacity of the polymer may rather decrease due to excessive surface crosslinking reaction, which is not preferable.

On the other hand, the surface crosslinking step may be performed by a conventional method such as a method in which the surface crosslinking solution containing the surface crosslinking agent and the base polymer powder are added to a reaction vessel and mixed, a method in which the surface crosslinking solution containing the surface crosslinking agent is sprayed onto the base polymer powder, a method in which the base polymer powder and the surface crosslinking solution are continuously supplied in a continuously operating mixer and mixed, and the like.

Moreover, when adding the surface crosslinking agent, water may be further added. Thus, adding the surface crosslinking agent and water together may induce uniform dispersion of the surface crosslinking agent, prevent the aggregation phenomenon of the base polymer powder, and further optimize the penetration depth of the surface crosslinking agent to the base polymer powder. In consideration of these objects and effects, the content of water to be added together with the surface crosslinking agent may be adjusted to 0.5 to 10 parts by weight based on 100 parts by weight of the base polymer powder.

The surface crosslinking step may be proceeded at a temperature of 100 to 250° C. Further, the surface crosslinking can be proceeded for 1 minute to 120 minutes, preferably 1 minute to 100 minutes, more preferably 10 minutes to 80 minutes. That is, in order to prevent the polymer particles from being damaged to thereby decrease their physical properties during excessive reaction while inducing the minimum surface cross-linking reaction, the surface crosslinking step may be carried out under the above-mentioned conditions.

The super absorbent polymer according to the present invention can exhibit more improved absorption rate and liquid permeability, while maintaining excellent basic absorption performance, and thus is preferably used for hygienic materials such as diapers having a thinner thickness.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

Example 1

As the manufacturing apparatus of a super absorbent polymer, a continuous manufacturing apparatus comprising a polymerization step, a hydrogel pulverizing step, a drying step, a pulverization step, a classification step, a surface cross-linking step, a cooling step, a classification step, and a transport step connecting respective steps can be used.

(Step 1)

0.7 parts by weight (7000 ppm) of polyethylene glycol diacrylate (weight average molecular weight: ~500 g/mol) as an internal crosslinking agent, 0.015 part (150 ppm) of allyl methacrylate and 0.01 part by weight of IRGACURE 819 as a photoinitiator were mixed to prepare a monomer solution. Subsequently, while continuously supplying the monomer solution by a metering pump, 160 parts by weight of a 24 wt % aqueous solution of sodium hydroxide was continuously subjected to line mixing to prepare an aqueous monomer solution. At this time, the temperature raised by the neutralizing heat was adjusted to 40° C. Further, 6 parts by weight of a 4 wt % aqueous solution of sodium persulfate was continuously subjected to line mixing, and then continuously supplied to a continuous polymerization reactor having a planar polymerization belt with a dam at each end. Thereafter, UV light was irradiated for 1 minute, and further thermal polymerization was carried out for 2 minutes to prepare a hydrogel. The water content of the hydrogel was confirmed to be 45% by weight.

(Step 2)

The hydrogel was cut to have an average size of about 300 mm or less, and then introduced into a pulverizer (equipped with a perforated plate including a plurality of holes having a diameter of 11 mm) together with a fine powder re-granulated body as shown in Table 1 below and pulverized under the respective conditions. Herein, the fine powder re-granulated body used the fine powder re-granulated body prepared in step 4 below, and the input ratio is shown in Table 1 as 20 weight % relative to the hydrogel.

(Step 3)

Then, the hydrogel pulverized in step 2 were dried in an oven capable of shifting airflow up and down. The hydrogel was uniformly dried by flowing hot air at 180° C. from the bottom to the top for 15 minutes and from the top to the bottom for 15 minutes, so that the dried product had a water content of about 2% or less.

(Step 4)

The polymer dried in step 3 was pulverized using a pulverizer and classified to obtain a base polymer having a size of 150 to 850 μm. On the other hand, through the above classification, the polymer part having a particle size of less than 150 μm was granulated with water and used for the fine powder re-granulated body of step 2 described above.

(Step 5)

Then, 100 parts by weight of the base polymer prepared in step 4 was mixed with a crosslinking agent solution containing 4 parts by weight of water and 1 part by weight of ethylene carbonate and then subjected to a surface crosslinking reaction at 180° C. for 40 minutes. Then, the obtained product was cooled and classified to obtain a surface-crosslinked super absorbent polymer having a particle diameter of 150 to 850 μm.

Examples 2 to 8 and Comparative Examples 1 TO 4

A super absorbent polymer was prepared in the same manner as in Example 1, except that the content range of the internal crosslinking agent, the hole diameter of the perforated plate provided in the gel pulverizer, the water content of the hydrogel and the input ratio of the fine powder re-granulated body were changed as shown in Table 1 below.

In the following Examples 1 to 8 and Comparative Examples 1 to 4, the gel strength of the hydrogel before and after the gel pulverization was measured by the method summarized in the following, and the measurement results are summarized and shown together in Table 1 below.

*Measurement Method of the Gel Strength of Hydrogel

A. Preparation of samples to be measured:

First, a hydrogel sample to be measured (a hydrogel sheet before gel pulverization and a hydrogel after gel pulverization) was prepared to have a diameter of about 2.5 cm and a thickness of about 2 to 5 mm. The prepared sample was loaded on a microbalance, and an appropriate amount of distilled water was evenly sprayed using a sprayer (At this time, the initial water content of the hydrogel was measured in advance (water content measuring instrument condition: 180° C., 40 minutes), and the amount of water required to match the initial water content was calculated). In order to uniformly adjust the water content inside the sample, it was sealed in vinyl and stored at room temperature for 12 hours or more.

B. Measurement Method:

A hydrogel sample with controlled water content was loaded between two plates of the rheometer (ARES-G2), and the gap between the two plates was properly adjusted by pressing the plates with a force of 3 N so that the sample was contacted at the front face of the plate. Rest time was given for 5 minutes to stabilize the sample. At the time of measurement, first, a strain in the linear viscoelastic regime section where the storage modulus (G') and the loss modulus (G") were constant was found while increasing the strain at a frequency of 10 rad/s.

After finding the strain value (usually 0.1%) in the linear regime section, the viscoelasticity (G', G") was measured for 60 seconds at a constant frequency (10 rad/s). After three or more measurements, the average value of G' was calculated as the gel strength (G').

TABLE 1

|  | Internal crosslinking agent (P/A*; ppm) | Hole diameter of perforated plate (mm) | Water content of hydrogel (wt %) | Input ratio of fine powder re-granulated body (wt %) | Gel strength of hydrogel before gel pulverization (Pa) | Gel strength of hydrogel after gel pulverization (Pa) | Gel strength ratio before and after gel pulverization (%) |
|---|---|---|---|---|---|---|---|
| Example 1 | 7000/150 | 11 | 45 | 20 | 23300 | 18500 | 79.4 |
| Example 2 | 7000/150 | 11 | 40 | 20 | 27700 | 20800 | 75.1 |
| Example 3 | 7000/150 | 11 | 50 | 20 | 19200 | 15900 | 82.8 |
| Example 4 | 8000/200 | 11 | 40 | 20 | 37400 | 26900 | 71.9 |
| Example 5 | 5000/100 | 11 | 50 | 20 | 15600 | 10300 | 66.0 |
| Example 6 | 7000/150 | 11 | 45 | 20 | 23100 | 17600 | 76.2 |
| Example 7 | 7000/150 | 13 | 40 | 25 | 27800 | 21500 | 77.3 |
| Example 8 | 7000/150 | 16 | 40 | 20 | 27600 | 23700 | 85.9 |
| Comparative Example 1 | 5000/100 | 11 | 65 | 20 | 6500 | 6000 | 92.3 |
| Comparative Example 2 | 7000/150 | 7 | 45 | 20 | 23200 | 7900 | 34.1 |
| Comparative Example 3 | 7000/150 | 20 | 45 | 20 | 23300 | 22600 | 97.0 |
| Comparative Example 4 | 3000/50 | 11 | 45 | 20 | 8500 | 7000 | 82.4 |

*Internal crosslinking agent P/A: polyethylene glycol diacrylate/allymethacrylate Referring to Table 1, it was confirmed that in Examples 1 to 8, the kind, content, water content and the like of the internal crosslinking agent are adjusted so that the hydrogel has a gel strength of 10,000 Pa or more, and the hole diameter and the water content of the perforated plate of the gel pulverizer are adjusted so that the gel strength after gel pulverization satisfies the range of 35 to 95% of the gel strength before gel pulverization.

In contrast, it was confirmed that in Comparative Example 1, the water content of the hydrogel before gel pulverization is excessively high, so that the hydrogel before and after gel pulverization shows a low gel strength. Even in Comparative Example 4, the content of the internal crosslinking agent is excessively low, so that the hydrogel before gel pulverization shows a low gel strength. Further, in Comparative Examples 2 and 3, the hole diameter of the perforated plate of the gel pulverizer is not maintained at an appropriate level, and so the gel strength after the gel pulverization deviates from the appropriate range.

Experimental Example

The physical properties of the super absorbent polymer prepared in Examples and Comparative Examples were measured and evaluated by the following methods.

(1) Centrifuge Retention Capacity (CRC)

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3. $W_0$ (g, about 0.2 g) of the super absorbent polymer was uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2(g)$ of the bag was then measured. Further, the same procedure was carried out without using the super absorbent polymer, and then the resultant weight $W_1(g)$ was measured. Using the respective weights thus obtained, CRC (g/g) was calculated according to the following Equation 1, thereby confirming the centrifuge retention capacity.

$$CRC(g/g)=\{[W_2(g)-W_1(g)-W_0(g)]/W_0(g)\}$$ [Equation 1]

(2) Saline Flow Conductivity (SFC)

The physiological saline flow conductivity (SFC) was measured and calculated according to the method disclosed in columns 54 to 59 of U.S. Pat. No. 5,562,646.

(3) T-20

9 g of sodium chloride and 0.1 g of Lorodac (main component: linear alcohol ethoxylate having 12 to 14 carbon atoms, CAS #68439-50-9) were dissolved in 1 L of distilled water to make an aqueous solution, and the T-20 was calculated and measured with the time required for absorbing 1 g of the super absorbent polymer to 20 g of this aqueous solution under pressure of 0.3 psi. Specific measurement methods of T-20 were described in detail on pages 13 to 18 of European Patent Publication No. 2535027.

(4) FSR (Free Swell Rate)

The FSR of the base polymer powder or the super absorbent polymer was measured and calculated by using those classified into #30 to #50 (for example, those having a particle diameter of 300 to 600 µm) according to the method disclosed on pages 22 to 23 of European Patent Publication No. 2535027.

(5) FHA

The measurement was performed after absorbing the super absorbent polymer to a physiological saline solution (0.9 wt % aqueous sodium chloride solution) under pressure of 0.3 psi, which was measured and calculated as a fixed height absorption (FHA) (20 cm). The other specific measurement and calculation method was performed according to the method disclosed in Examples of U.S. Pat. No. 7,108,916.

The physical property values of Examples 1 to 8 and Comparative Examples 1 to 4 measured by the above method are summarized in Table 2 below.

TABLE 2

| | CRC | FHA | FSR | SFC | T-20 |
|---|---|---|---|---|---|
| | | | Unit | | |
| | g/g | g/g | g/g/s | $10^{-7}$ cm$^3$ · s/g | s |
| Example 1 | 28.5 | 24.5 | 0.32 | 55 | 140 |
| Example 2 | 28.1 | 24.2 | 0.33 | 53 | 133 |
| Example 3 | 29.0 | 24.6 | 0.30 | 56 | 145 |
| Example 4 | 27.1 | 24.0 | 0.36 | 63 | 123 |
| Example 5 | 28.8 | 23.7 | 0.30 | 47 | 147 |
| Example 6 | 28.3 | 24.3 | 0.32 | 51 | 139 |
| Example 7 | 28.6 | 24.5 | 0.30 | 55 | 146 |
| Example 8 | 28.7 | 24.6 | 0.29 | 57 | 154 |
| Comparative Example 1 | 29.0 | 22.0 | 0.19 | 18 | 233 |
| Comparative Example 2 | 25.6 | 21.1 | 0.33 | 23 | 134 |
| Comparative Example 3 | 27.1 | 23.3 | 0.18 | 57 | 241 |
| Comparative Example 4 | 29.1 | 22.8 | 0.20 | 18 | 213 |

Referring to Table was confirmed that in the case of Examples 1 to 8, the basic absorption performance defined by CRC is excellent, the suction force under pressure defined by FHA and the liquid permeability defined by the SEC are excellent, and the absorption rates defined by T-20 or FSR are also excellent.

In contrast, it was confirmed that in the case of Comparative Examples 1 to 4, at least one of the liquid permeability, the absorption rate or the absorption under pressure is poor as compared with Examples.

The invention claimed is:

1. A method for producing a super absorbent polymer comprising:
   performing crosslinking polymerization of a water-soluble ethylenically unsaturated monomer having at least partially neutralized acidic groups in the presence of an internal crosslinking agent to form a hydrogel polymer containing a first crosslinked polymer and having a gel strength of 10000 Pa or more;
   performing gel pulverization of the hydrogel polymer so that the gel strength after pulverization becomes 35% to 95% of the gel strength before the gel pulverization;
   drying, pulverizing and classifying the gel pulverized hydrogel polymer to form a base polymer power; and
   heat-treating and surface-crosslinking the base polymer powder in the presence of a surface crosslinking agent to form a super absorbent polymer particle.

2. The method for producing a super absorbent polymer according to claim 1, wherein the internal crosslinking agent includes a polyolpoly(meth)acrylate-based first internal crosslinking agent and an allyl(meth)acrylate-based second crosslinking agent,
   wherein the polyolpoly(meth)acrylate-based first internal crosslinking agent is contained in an amount of 0.4 to 1 part by weight based on 100 parts by weight of a monomer composition including the internal crosslinking agent and the water-soluble ethylenically unsaturated monomer, and the an allyl(meth)acrylate-based second internal crosslinking agent is contained in an amount of 0.008 to 0.5 parts by weight based on 100 parts by weight of the monomer composition.

3. The method for producing a super absorbent polymer according to claim 1, wherein in the performing gel pulverization of the hydrogel polymer, the hydrogel polymer has a water content of 38 to 60% by weight, and the hydrogel polymer is subjected to a gel pulverization through an extruder equipped with a perforated plate having a plurality of holes with a diameter of 9 to 18 mm.

4. The method for producing a super absorbent polymer according to claim 1, further comprising:
  recovering a fine powder having a particle diameter of less than 150 μm after the classification step;
  re-granulating the fine powder in the presence of an aqueous solvent to form a fine powder re-granulated body; and
  mixing the fine powder re-granulated body with the hydrogel polymer before the drying,
  wherein the fine powder re-granulated body is used in an amount of 10 to 30 parts by weight based 100 parts by weight of the hydrogel polymer before the drying.

5. The method for producing a super absorbent polymer according to claim 1, wherein the surface crosslinking agent includes an alkylene carbonate-based compound or a polyhydric alcohol-based compound.

6. The method according to claim 1, wherein the gel strength is 10,000 Pa to 50,000 Pa.

* * * * *